United States Patent [19]

Cuevas et al.

[11] Patent Number: 5,536,040
[45] Date of Patent: Jul. 16, 1996

[54] INFLATOR FOR SIDE IMPACT AIR BAG

[75] Inventors: Jess A. Cuevas, Scottsdale; Mitchell P. Zakula, Tempe, both of Ariz.

[73] Assignee: TRW Inc., Lyndhurst, Ohio

[21] Appl. No.: 427,409

[22] Filed: Apr. 24, 1995

[51] Int. Cl.[6] ................................................. B60R 21/26
[52] U.S. Cl. ............................................. 280/737; 280/741
[58] Field of Search ....................................... 280/737, 741

[56] References Cited

U.S. PATENT DOCUMENTS

| | | | |
|---|---|---|---|
| 3,806,153 | 4/1974 | Johnson | 280/732 |
| 3,862,767 | 1/1975 | Chute | 280/732 |
| 5,000,479 | 3/1991 | Werner et al. | 280/736 |
| 5,076,607 | 12/1991 | Woods et al. | 280/737 |
| 5,094,475 | 3/1992 | Olsson et al. | 280/741 |
| 5,131,680 | 7/1992 | Coultas et al. | 280/737 |
| 5,242,194 | 9/1993 | Popek | 280/737 |
| 5,273,312 | 12/1993 | Coultas et al. | 280/737 |
| 5,340,148 | 8/1994 | Faigle et al. | 280/730.2 |
| 5,344,186 | 9/1994 | Bergerson et al. | 280/741 |
| 5,350,192 | 9/1994 | Blumenthal | 280/737 |
| 5,388,859 | 2/1995 | Fischer et al. | 280/737 |

Primary Examiner—Kenneth R. Rice
Attorney, Agent, or Firm—Tarolli, Sundheim, Covell, Tummino & Szabo

[57] ABSTRACT

An air bag inflator (20, 220, 420) comprises first and second coaxial tubes (22, 24, 222, 224, 422, 424) which define respective first and second chambers (62, 64, 262, 264, 462, 464). The tubes (22, 24, 222, 224, 422, 424) have terminal ends (42, 44, 242, 244). A weld securement (46, 246, 446) fixes the terminal ends (42, 44, 242, 244) of the tubes (22, 24, 222, 224, 422, 424) together so the chambers (62, 64, 262, 264, 462, 464) extend in opposite directions from the securement (46, 246, 446). The first chamber (62, 262, 462) contains inflation fluid under pressure. The second tube (64, 264, 464) has passages (82, 282, 482) for directing inflation fluid from the first chamber (62, 262, 462) into an air bag. A rupturable wall (66, 266, 466) blocks fluid communication between the first and second chambers (62, 64, 262, 264, 462, 464). A canister (102, 302, 502) in the second chamber (64, 264, 464) has a section which moves to rupture the wall (66, 266, 466) to enable the inflation fluid to flow from the first chamber (62, 262, 462) into the second chamber (64, 264, 464). An energizable initiator (142, 342, 542) is located in the second chamber (64, 264, 464) to, when energized, move the movable section of the canister to rupture the wall (66, 266, 466).

31 Claims, 3 Drawing Sheets

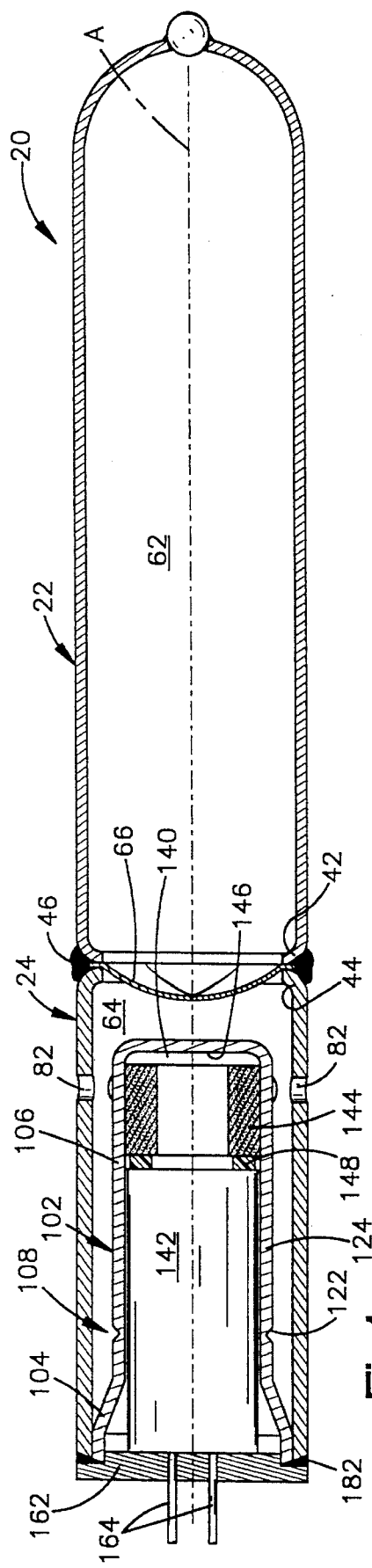
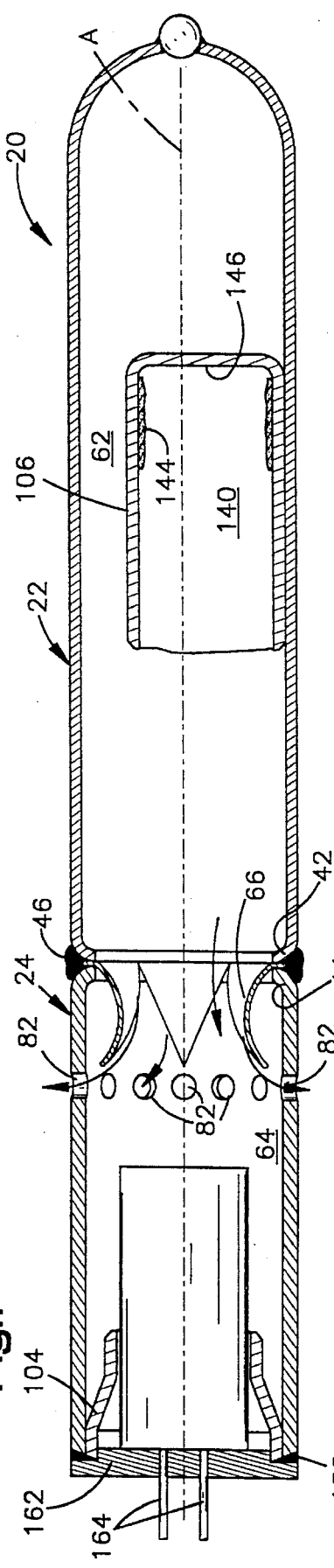
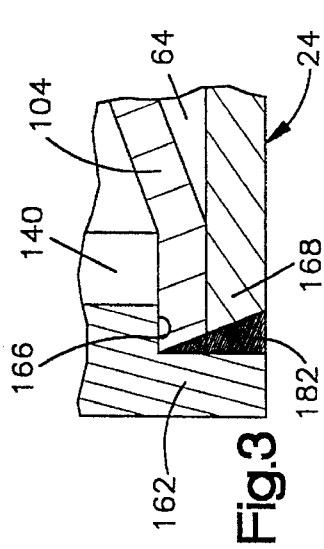
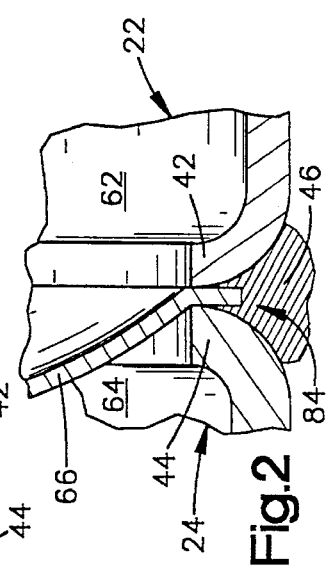

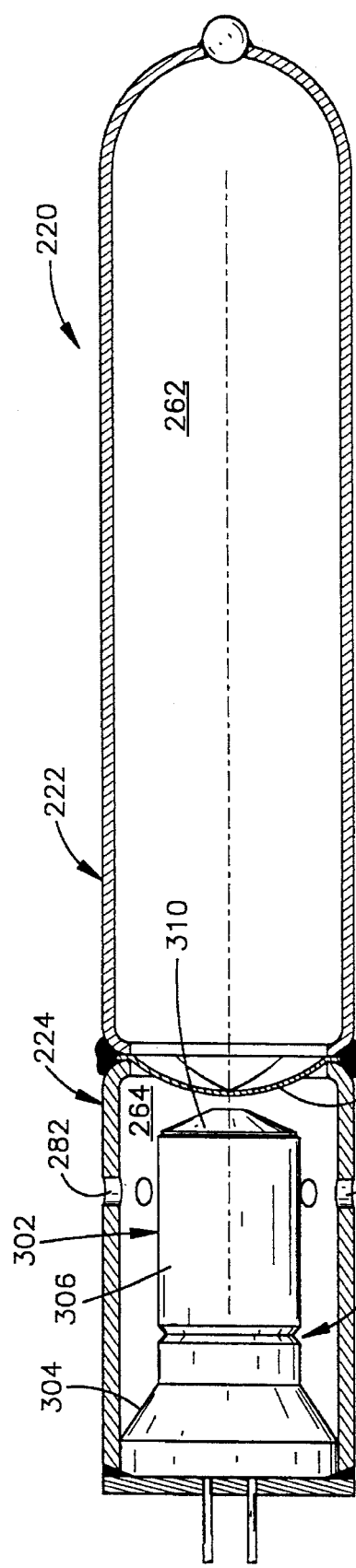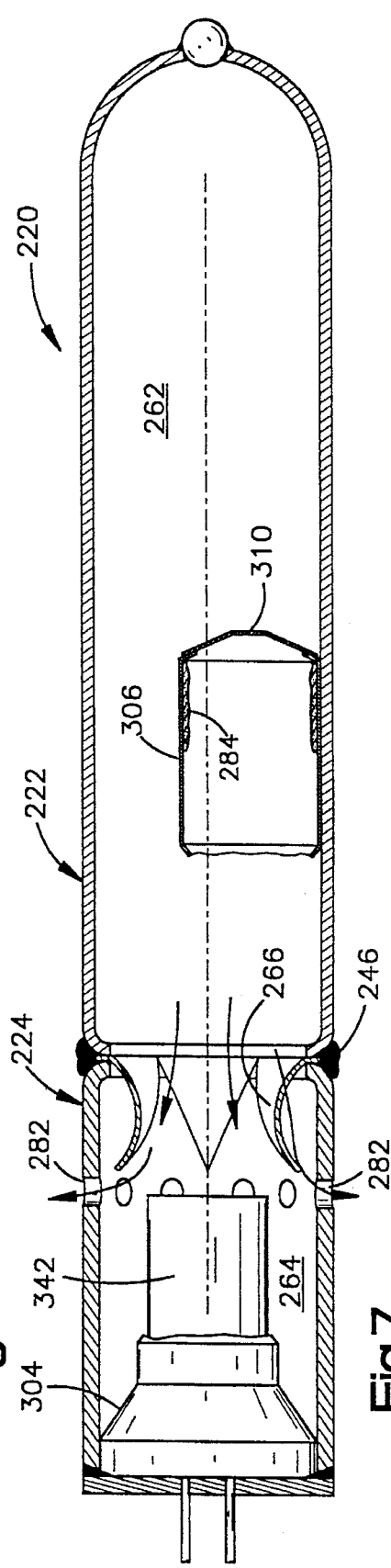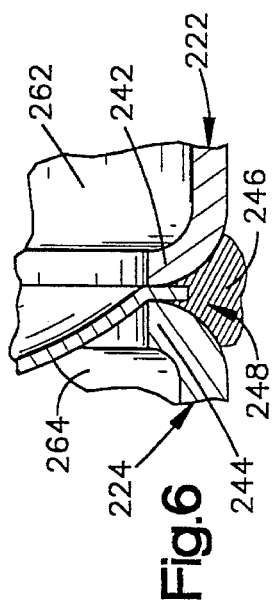

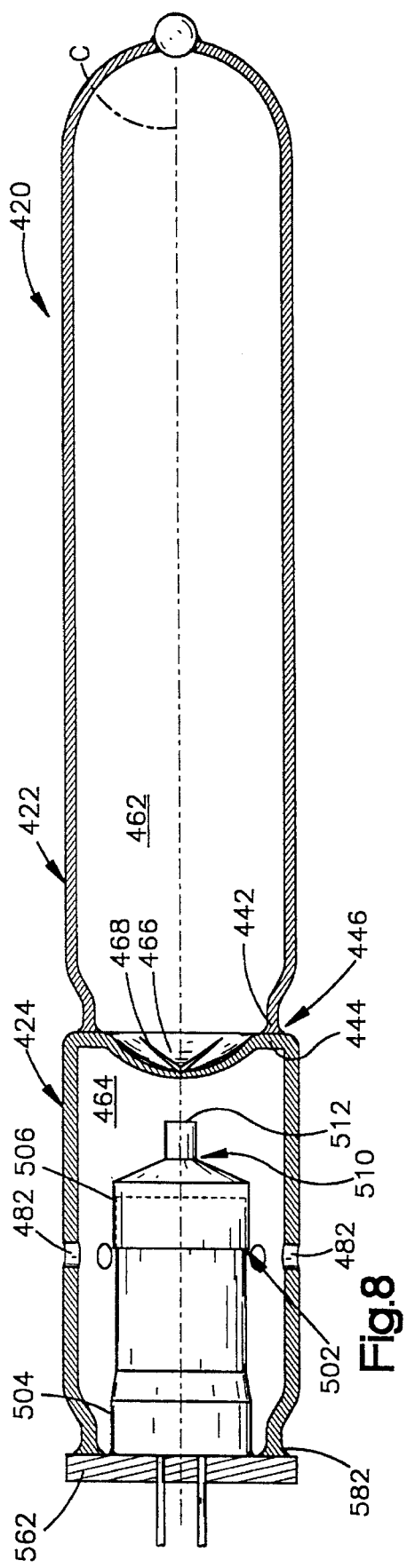
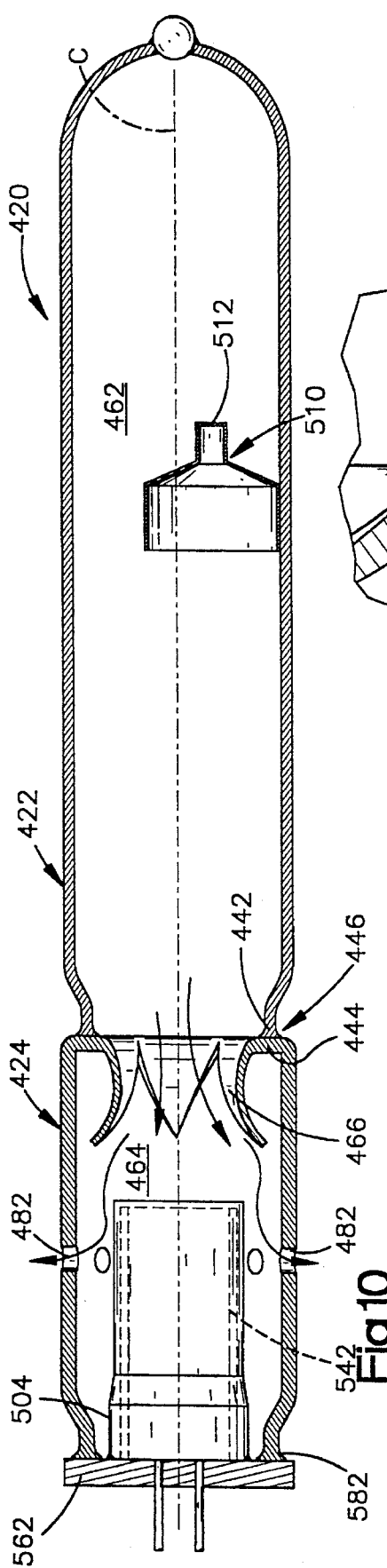
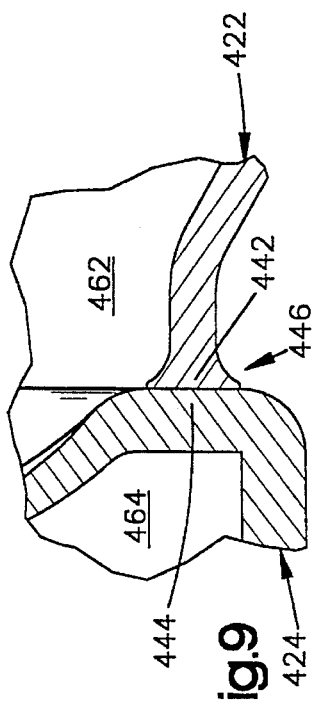

5,536,040

INFLATOR FOR SIDE IMPACT AIR BAG

BACKGROUND OF THE INVENTION

1. Technical Field

The present invention relates to a source of inflation fluid for an inflatable vehicle occupant protection system. In particular, the present invention relates to an inflator for providing inflation fluid to inflate an air bag.

2. Description of the Prior Art

U.S. Pat. No. 5,094,475 discloses an air bag system including an inflator which is a gas generating unit. The gas generating unit includes a diffuser tube having axially opposite end portions. Each end portion is received within a respective one of a pair of gas generating elements. Each of the gas generating elements includes a housing that contains an ignitable gas generating material, such as cellulose nitrate. Upon ignition, the gas generating material provides an inflation gas, such as carbon monoxide. The inflation gas breaks a seal on the housing and flows into the diffuser tube. The inflation gas then fills and inflates an air bag so that it extends from a vehicle door.

U.S. Pat. No. 3,806,153 discloses an inflator for an air bag system. The inflator includes a container defining a closed chamber for storing an inflation fluid under pressure. An end of a charge chamber housing is threaded into an end of the container. The charge chamber housing contains an ignitable propellant charge and a plunger-nozzle member. Upon ignition of the ignitable propellant charge, the plunger-nozzle member moves to break a closure located between the charge chamber housing and the container to enable the inflation fluid to flow from the container through passages in the charge chamber housing and to an air bag. The gas from ignition of the propellant material also flows through an orifice in the plunger-nozzle member to heat the inflation fluid in the container.

U.S. Pat. No. 5,076,607 discloses an inflator having several generally tubular members welded together. One tubular member defines a diffuser and has an end portion disposed within another tubular member which defines a chamber for storing inflation fluid. A burst disk blocks fluid communication between the chamber and the diffuser. The burst disk is ruptured by a sliding piston in response to ignition of a propellant material in yet another tubular member.

SUMMARY OF THE INVENTION

The present invention is directed to an inflator for a vehicle side impact inflatable occupant protection system. The inflator includes a pair of tubes and is relatively compact to fit within a vehicle door or side panel. The inflator provides a sufficient volume of inflation fluid to inflate an air bag.

The inflator comprises first and second coaxial tubes which define respective first and second chambers. Each of the tubes has a terminal end. A weld securement fixes the terminal ends of the tubes together so the chambers extend in opposite directions from the weld securement. The first chamber contains inflation fluid under pressure. The second tube has a passage for directing inflation fluid into an air bag. A rupturable wall blocks fluid communication between the first and second chambers. Movable means in the second chamber ruptures the wall, upon moving a predetermined distance, to enable the inflation fluid to flow from the first chamber into the second chamber. Initiator means is located in the second chamber for, when energized, effecting the movement of the movable means.

Ignitable material may be located in the second chamber which, when ignited, heats the inflation fluid as it flows into the second chamber. The initiator means, upon energization, ignites the ignitable material to propel the movable means to effect the rupture of the wall.

Each terminal end of the first and second tubes comprises an axially outermost end surface of the respective tube. The terminal end of at least one of the first and second tubes comprises an end portion of the tube deformed radially inward.

The rupturable wall comprises a closure member fixed to and located between the terminal ends of the first and second tubes. The rupturable wall, according to an alternate embodiment, is formed in one piece with the second tube.

The movable means comprises a canister having a movable section separable from a base section in response to energization of the initiator means. The movable section moves the predetermined distance to penetrate the rupturable wall. The movable section may include a hardened portion and/or a force concentrator for engaging and penetrating the rupturable wall. The movable section includes a cylindrical portion guided by one of the initiator means and the base section during initial movement.

BRIEF DESCRIPTION OF THE DRAWINGS

Further features and advantages of the present invention will become apparent to those skilled in the art to which the present invention relates from reading the following specification with reference to the accompanying drawings, in which:

FIG. 1 is a schematic longitudinal cross-sectional view of an inflator according to one embodiment of the invention;

FIG. 2 is an enlarged sectional view of a portion of the inflator in FIG. 1;

FIG. 3 is an enlarged sectional view of another portion of the inflator in FIG. 1;

FIG. 4 is a view similar to FIG. 1 with parts in different positions;

FIG. 5 is a schematic longitudinal cross-sectional view of an inflator according to all other embodiment of the invention;

FIG. 6 is an enlarged sectional view of a portion of the inflator in FIG. 5;

FIG. 7 is a view similar to FIG. 5 with parts in different positions;

FIG. 8 is a schematic longitudinal cross-sectional view of an inflator according to yet another embodiment;

FIG. 9 is an enlarged sectional view of a portion of the inflator in FIG. 8; and FIG. 10 is a view similar to FIG. 8 with parts in different positions.

DESCRIPTION OF PREFERRED EMBODIMENTS

First Embodiment—Structure

An air bag inflator 20, according to one embodiment of the present invention, is illustrated in FIG. 1. The inflator 20 includes a first tube 22 fixed to a second tube 24. The first and second tubes 22 and 24 are disposed along a longitudinal central axis A of the inflator 20.

The first and second tubes 22, 24 are attached at terminal ends 42, 44, respectively, by a weld securement 46 (best seen in FIG. 2). The first and second tubes 22, 24 extend coaxially in opposite directions along the axis A from the weld securement 46. The first and second tubes 22, 24 are made from a metal, such as a steel alloy or aluminum alloy, and have substantially equal diameters for the majority of their lengths.

The terminal end 42 of the first tube 22 is deformed radially inwardly and defines an axially leftmost portion of the first tube, as viewed in FIGS. 1 and 2. The terminal end 44 of the second tube 24 is also deformed radially inwardly and defines an axially rightmost portion of the second tube. Each of the terminal ends 42, 44 provides an annular surface extending normal to the axis A.

The first tube 22 defines a first chamber 62 for storing an inflation fluid under pressure. The inflation fluid is preferably an inert and non-combustible gas, such as argon or nitrogen, or a mixture of gases to inflate an air bag (not shown). The second tube 24 defines a second chamber 64. The second tube 24 includes a plurality of circumferentially arranged passages 82 which provide fluid communication between the second chamber 64 and the air bag.

A rupturable closure member 66 blocks fluid communication between the first and second chambers 62, 64, when unruptured. The closure member 66 is engaged and captured around 360° of its outer periphery on both sides between the annular surfaces defined by the terminal ends 42, 44 of the tubes 22, 24. The terminal ends 42, 44, being deformed radially inwardly, define a channel 84 (FIG. 2) when engaging opposite sides of the closure member 66. Thus, the weld securement 46 has a relatively large surface area to contact for connecting the tubes 22, 24 together.

The closure member 66 is made from a relatively thin metal material. The closure member 66 may be scored to provide a weakened area at which the rupture occurs. When the closure member 66 ruptures, as illustrated in FIG. 4, the inflation fluid in the first chamber 62 flows into the second chamber 64. The inflation fluid then flows freely into the air bag through the passages 82.

The second chamber 64 contains a closed metal canister 102 containing an initiator 142 and a charge of ignitable material 144. The canister 102 includes a base section 104 connected to an end portion of the second tube 24. A movable section 106 of the canister 102 is connected to the base section 104 at a frangible section 108. The frangible section 108 breaks and permits the movable section 106 to move away from the base section 104 to engage and rupture the closure member 66 in response to ignition of the ignitable material 144. The frangible section 108 includes a circumferentially extending stress riser 122 formed in a cylindrical body portion 124 of the canister 102.

The initiator 142 is energizable and is disposed within a chamber 140 of the canister 102 to move the movable section 106 of the canister away from the base section 104 to rupture the closure member 66. The ignitable material 144 is located axially adjacent the initiator 142 in the chamber 140 of the canister 102 and is separated from the initiator by a cushion 148. The initiator 142 produces combustion products to ignite the ignitable material 144.

Ignition of the ignitable material 144 produces combustion products in the chamber 140. The combustion products pressurize the chamber 140 and act on an axial end 146 of the canister 102. Pressure from the combustion products acting on the axial end 146 of the canister 102 separate the movable section 106 from base section 104 by breaking the canister 102 at the stress riser 122 of the frangible section 108.

An inner surface of the cylindrical body portion 124 of the movable section 106 is guided along an outer surface of a cylindrical portion of the body of the initiator 142 as the movable section moves to the right, as viewed in FIG. 4. The movable section 106 is guided by the cylindrical portion of the initiator 142 for a predetermined distance of initial movement. This assures that the only direction that the movable section 106 may move is axially along the axis A to the right, as viewed in FIG. 4, to rupture the closure member 66.

An end flange 162 (FIGS. 1 and 3) is part of the initiator 142 and closes an open end of the second tube 24 which is axially opposite from the terminal end 44. Electrical connector leads 164 of the initiator 142 extend through the end flange 162. The end flange 162 mounts the initiator 142 and canister 102 within the second chamber 64. The end flange 162 includes an annular recessed end portion 166 (best seen in FIG. 3) that positions and receives the base section 104 of the canister 102 between an end 168 of the second tube 24. The end flange 162 of the initiator 142, the base section 104 of the canister 102 and end 168 of the second tube 24 are welded together by an annular weld bead 182.

Operation

Upon the occurrence of an emergency situation, such as a collision from the side of a vehicle, an electrical signal is communicated from a sensor (not shown) to the initiator 142 over the connector leads 164 to energize the initiator. Energization of the initiator 142 causes initiating combustion products to be released into the chamber 140 and contact the ignitable material 144. The ignitable material 144 ignites to produce additional combustion products. A pressure increase in the chamber 140 due to combustion of the ignitable material 144 acts on the axial end surface 146 and breaks the frangible section 108 of the canister 102.

The movable section 106 of the canister 102 is propelled to the right, as viewed in FIGS. 1 and 4, away from the base section 104 by combustion of the ignitable material 144. As the movable section 106 of the canister moves to the right, it is guided by the cylindrical body of the initiator 142. The movable section 106 of the canister 102 moves a distance sufficient to engage the closure member 66 with sufficient force to rupture the closure member while the movable section is still being guided by the cylindrical body of the initiator 142. The now broken closure member 66 assumes the condition illustrated in FIG. 4 by the pressure of the inflation fluid in the first chamber 62 entering the second chamber 64.

The movable section 106 of the canister 102 moves further to the right into the first chamber 62 towards the position illustrated in FIG. 4 after rupturing the closure member 66. As the ignitable material 144 continues to burn, the combustion products heat the inflation fluid as the inflation fluid flows into the second chamber 64. The heated inflation fluid then flows through the passages 82 in the second tube 24 and into the air bag to inflate the air bag.

Second Embodiment—Structure

An air bag inflator 220 according to another embodiment of the present invention is illustrated in FIGS. 5–7 and is similar in construction and operation to the inflator 20 illustrated in FIGS. 1–4. The inflator 220 (FIG. 5) includes a first tube 222fixed to a second tube 224. The first and second tubes 222, 224 are attached together at terminal ends 242, 244, respectively, at a weld securement 246 (best seen in FIG. 6).

The terminal end 242 of the first tube 222 is deformed radially inward and defines the axially leftmost portion of the first tube, as viewed in FIGS. 5 and 6. The terminal end 244 of the second tube 224 is also deformed radially inward and defines the axially rightmost portion of the second tube. The terminal ends 242, 244, when located in the relative position illustrated in FIG. 6, cooperate to define a channel 248 for the weld securement 246.

The first tube 222 defines a first chamber 262 for storing an inflation fluid under pressure. The second tube 224 defines a second chamber 264 which is in fluid communication with an air bag. The second tube 224 includes a plurality of circumferentially arranged passages 282 which provide the fluid communication between the second chamber 264 and the air bag.

A rupturable closure member 266 blocks fluid communication between the chambers 262, 264. The closure member 266 is made from a thin metal material. The closure member 262 is engaged and captured around 360° of its outer periphery on both sides between the terminal ends 242, 244 of the tubes 222, 224. When the closure member 266 is ruptured, as viewed in FIG. 7, the inflation fluid in the first chamber 262 flows into the second chamber 264. The inflation fluid then flows freely into the air bag through the passages 282.

The second chamber 264 contains a metal canister 302 for rupturing the closure member 266. A charge of ignitable material 284 (FIG. 7) is located in the canister 302. The canister 302 includes a base section 304 connected to the end of the second tube 322 opposite the terminal end 244. A movable section 306 is connected to the base section 304 at a frangible section 308. The frangible section 308 breaks to permit the movable section 306 to move away from the base section 304 and rupture the closure member 266.

The movable section 306 includes a hardened tip section 310 made from a steel material that is fixed to the end of the movable section. The hardened tip section 310 is provided to add strength to the end of the movable section 306 to assure that the end of the movable section does not burst due to combustion of the ignitable material 284 within the canister 302 prior to breakage of the frangible section 308. An energizable initiator 342 (FIG. 7) is located within the canister 302 to ignite the ignitable material 284 and start movement of the movable section 306 to rupture the closure member 266.

Operation

Upon the occurrence of an emergency situation, such as a collision requiring inflation of an air bag to protect a vehicle occupant, an electrical signal is communicated from a sensor (not shown) to the initiator 342 to energize the initiator. Energization of the initiator 342 causes the frangible section 308 of the canister 302 to break. The movable section 306 of the canister 302 moves to the right, as viewed in FIG. 7, away from the base section 304.

The movable section 306 engages the closure member 266 to rupture the closure member. The now broken closure member 266 assumes the condition illustrated in FIG. 7. The movable section 306 of the canister 302 continues to move further to the right into the first chamber 262 towards the position illustrated in FIG. 7 after rupturing the closure member 266. The inflation fluid then is heated by combustion of the ignitable material 284 and flows through the passages 282 in the second tube 224 and into the air bag to inflate the air bag.

Third Embodiment—Structure

A hybrid type of air bag inflator 420 according to yet another embodiment of the present invention is illustrated in FIGS. 8–10. The inflator 420 includes a first tube 422 fixed to a second tube 424. The first and second tubes 422, 424 are attached together at terminal ends 442, 444, respectively, at a weld securement 446 (best seen in FIG. 9). The weld securement 446 is preferably formed by a friction welding operation.

The first and second tubes 422, 424 extend coaxially along a longitudinal central axis C of the inflator 420 in opposite directions from the weld securement 446. The first and second tubes 422, 424 are made from a metal, such as a steel alloy or aluminum alloy, and have substantially equal diameters over most of their lengths.

The first tube 422 defines a first chamber 462 for storing an inflation fluid under pressure. The second tube 424 defines a second chamber 464 which is in fluid communication with an air bag (not shown). The second tube 424 includes a plurality of circumferentially arranged passages 482 which provide the fluid communication with the air bag.

A rupturable closure member 466 is formed in one piece with the second tube 424 during a drawing operation. The closure member 466 blocks fluid communication between the chambers 462, 464, when unruptured. The closure member 466 is preferably coined at a recessed portion to provide a weakened area 468 which ruptures in a predetermined manner. When the closure member 466 ruptures, as viewed in FIG. 10, the pressurized inflation fluid in the first chamber 462 flows into the second chamber 464. The inflation fluid then flows freely into the air bag through passages 482 in the second tube 424.

The terminal end 442 of the first tube 422 is deformed radially inward a relatively small distance adjacent the axially leftmost portion of the first tube, as viewed in FIGS. 8 and 9. The terminal end 444 of the second tube 424 defines the axially rightmost portion of the second tube and an annular surface which extends normal to the axis C and which surrounds the closure member 466. The terminal end 442 also defines an annular surface that has a relatively smaller radial thickness than outermost portion of the terminal end 444. The annular surface of the terminal end 442 is centered on the annular surface of the terminal end 444.

The second chamber 464 contains a metal canister assembly 502 for rupturing the closure member 466. The canister 502 includes a base section 504 connected to an end cap 562. A cap or movable section 506 frictionally engages the base section 504. The frictional engagement is overcome to permit the movable section 506 to move away from the base section 504 a predetermined distance to engage and rupture the closure member 466.

An initiator 542 (FIG. 10) is disposed within the canister 502 to start movement of the movable section 506 of the canister to rupture the closure member 466. Upon energization of the initiator 542, pressure of initiating combustion products acts on the interior of the movable section 506. Pressure within the canister 502 separates the movable section 506 from the base section 504. The movable section 506 is guided by the base section 504 for a predetermined distance, which is at least until the movable section contacts the closure member 466.

A hardened tip section 510 of the movable section 506 engages the closure member 466 and ruptures the closure member. The hardened tip section 510 includes a force concentrator portion 512 having a diameter which is smaller than the diameter of the main portion of the canister 502 to concentrate a force of the movable section 506 contacting the closure member 466 at a desired location, preferably at or near the center of the weakened area 468.

The end cap 562 (FIG. 8) of the initiator 542 closes an open end of the second tube 424 at an end axially opposite from the terminal end 444. The end flange 562 supports the initiator 542 and canister 502 within the second chamber 464. The end flange 562 is friction welded to the second tube 424 at a weldment 582.

Operation

Upon the occurrence of an emergency situation, such as a collision requiring inflation of an air bag to protect a vehicle occupant, an electrical signal is communicated from a sensor (not shown) to the initiator 542 to energize the initiator. Energization of the initiator 542 causes initiating combustion products to be introduced into the canister 502. A pressure increase in the canister assembly 502 due to the initiating combustion products moves the movable section 506 of the canister away from the base section 504. The movable section 506 of the canister assembly 502 moves to the right, as viewed in FIG. 10, away from the base section 504.

The movable section 506 of the canister assembly 502 moves a distance sufficient for the hardened tip section 510 and force concentrator 512 to engage and rupture the closure member 466 at the weakened area 468. The now broken closure member 466 assumes the condition illustrated first in FIG. 10 by the pressure of the inflation fluid in the first chamber 462 entering the second chamber 464. The movable section 506 of the canister 502 continues to move further to the right into the first chamber 462 towards the position illustrated in FIG. 10 after rupturing the closure member 466. The inflation fluid flows into the second chamber 464 and then flows through the passages 482 in the second tube 424 and into the air bag to inflate the air bag.

From the above description of the invention, those skilled in the art will perceive improvements, changes and modifications. Such improvements, changes and modifications within the skill of the art are intended to be covered by the appended claims.

Having described the invention, the following is claimed:

1. An air bag inflator comprising:

first and second coaxial tubes defining respective first and second chambers, each of said first and second tubes having terminal ends, said first chamber containing inflation fluid under pressure, said second tube having a passage for directing inflation fluid from the second chamber into an air bag;

a weld securement fixing said terminal ends together with said first and second tubes extending in opposite directions from said securement;

a rupturable wall blocking fluid communication between said first and second chambers;

a canister in said second chamber having a movable section to rupture said wall upon moving a predetermined distance to enable inflation fluid to flow from said first chamber into said second chamber; and energizable initiator means located in said canister for, when energized, causing said movable section to move the predetermined distance.

2. The inflator set forth in claim 1 further including ignitable material in said second chamber which, when ignited in response to energization of said initiator means, propels said movable section and heats the inflation fluid.

3. The inflator set forth in claim 1 wherein each of said terminal ends of said first and second tubes comprises an axially outermost end surface of the respective tube.

4. The inflator set forth in claim 3 wherein said terminal ends of said first and second tubes comprise at least one of said tubes having an end portion deformed radially inward to define one of said axially outermost end surfaces.

5. The inflator set forth in claim 4 wherein said terminal ends of said first and second tubes comprise each of said tubes having respective end portions deformed radially inward to define said axially outermost end surfaces.

6. The inflator set forth in claim 1 wherein said rupturable wall comprises a closure member fixed to and located between said terminal ends of said first and second tubes.

7. The inflator set forth in claim 1 wherein said rupturable wall comprises a closure member formed in one piece with said second tube.

8. The inflator set forth in claim 1 wherein said canister further includes a base section connected to a surface defining said second chamber, said movable section being attached to said base section.

9. The inflator set forth in claim 8 further including a frangible section connecting together said movable section and said base section, said frangible section breaking, in response to energization of said initiator means, to permit said movable section to move away from said base section.

10. The inflator set forth in claim 8 wherein said movable section comprises a cap in frictional engagement with said base section, said frictional engagement being overcome in response to energization of said initiator means to permit said movable section to move away from said base section.

11. The inflator set forth in claim 8 further including a flange of said initiator means closing an end of said second tube axially opposite said terminal end, and wherein said canister includes a tubular base section fixed to and located coaxially between said end of said second tube and at least a portion of said flange.

12. The inflator set forth in claim 8 wherein said movable section includes a tubular portion guided by one of said base section and said initiator means during initial movement.

13. The inflator set forth in claim 1 further including a hardened end portion on said movable section.

14. The inflator set forth in claim 1 further including a force concentrator portion formed on said movable section.

15. An air bag inflator comprising:

first and second tubes defining respective first and second chambers, said tubes having terminal ends, said first chamber being a closed chamber containing inflation fluid under pressure, said second tube having passages for directing the inflation fluid into an air bag;

a weld securement fixing said terminal ends together with said chambers extending in opposite directions from said securement;

movable means in said second chamber for opening said first chamber, upon moving a predetermined distance, to enable the inflation fluid to flow from said first chamber into said second chamber; and energizable initiator means located in said second chamber for, when energized, effecting movement of said movable means.

16. The inflator set forth in claim 15 wherein said first and second tubes extend coaxially from said weld securement.

17. The inflator set forth in claim 15 wherein each of said terminal ends of said first and second tubes comprises an axially outermost end surface of a respective tube.

18. The inflator set forth in claim 17 wherein said terminal ends of said first and second tubes comprise at least one of said tubes having an end portion deformed radially inward to define one of said axially outermost end surfaces.

19. The inflator set forth in claim 18 wherein said terminal ends of said first and second tubes comprise each of said tubes having respective end portions deformed radially inward to define said axially outermost end surfaces.

20. The inflator set forth in claim 15 further including ignitable material in said second chamber which, when ignited in response to energization of said initiator means, propels said movable means and heats the inflation fluid.

21. The inflator set forth in claim 15 wherein said closed first chamber is defined by a rupturable wall located between said terminal ends of said first and second tubes.

22. The inflator set forth in claim 15 wherein said closed first chamber is defined by a closure member formed in one piece with said second tube.

23. The inflator set forth in claim 15 further including a flange of said initiator means closing an axial end of said second tube opposite said terminal end, said movable means comprising a canister with a tubular base section fixed to and located coaxially between said axial end of said second tube and at least a portion of said flange.

24. The inflator set forth in claim 15 wherein said canister further includes a base section connected to a surface defining said second chamber, said movable section being attached to said base section.

25. The inflator set forth in claim 24 further including a frangible section connecting together said movable section and said base section, said frangible section breaking, in response to energization of said initiator means, to permit said movable section to move away from said base section.

26. The inflator set forth in claim 24 wherein said movable section comprises a cap in frictional engagement with said base section, said frictional engagement being overcome in response to energization of said initiator means to permit said movable section to move away from said base section.

27. The inflator set forth in claim 24 wherein said movable section includes a tubular portion guided by one of said base section and said initiator means during initial movement.

28. The inflator set forth in claim 15 further including a hardened end portion on said movable section.

29. The inflator set forth in claim 15 further including a force concentrator portion formed on said movable section.

30. An air bag inflator comprising:

first and second coaxial tubes defining respective first and second chambers, said tubes having terminal ends, said terminal ends being fixed together, and said first and second tubes extending in opposite directions from their respective terminal ends;

said first chamber being a closed chamber containing inflation fluid under pressure;

said second tube having openings for directing inflation fluid from said second chamber into an air bag;

actuatable means in said second chamber for, when actuated, effecting the opening of said first chamber to enable the inflation fluid to flow from said first chamber to said second chamber; and energizable initiator means located in said second chamber for, when energized, actuating said actuatable means.

31. An air bag inflator comprising:

first and second tubes defining respective first and second chambers, said tubes having terminal ends, said first chamber being a closed chamber containing inflation fluid under pressure, said second tube having passages for directing the inflation fluid into an air bag;

a weld securement fixing said terminal ends together with said chambers extending in opposite directions from said securement;

movable means in said second chamber for opening said first chamber, upon movement, to enable the inflation fluid to flow from said first chamber into said second chamber;

ignitable material in said second chamber which, when ignited, effects movement of said movable means and heats the inflation fluid; and energizable initiator means located in said second chamber for, when energized, igniting said ignitable material.

* * * * *